Figure 1:
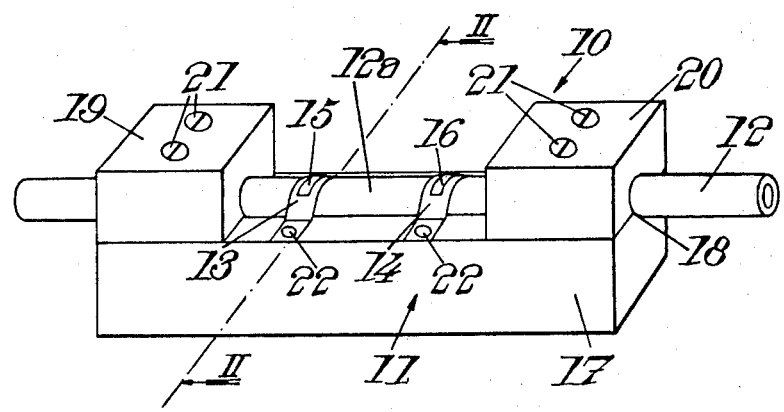

United States Patent [19]

Dupont et al.

[11] 4,090,404

[45] May 23, 1978

[54] APPARATUS AND METHODS OF DETECTING INJECTION IN A DIESEL ENGINE

[75] Inventors: Jean-Pierre Dupont, Soignolles-en-Brie, France; Jean-François Gregoire, Niamey, Niger; Michel Ligier, Paris; Jacques Roy, Boulogne-Billancourt, both of France

[73] Assignee: Souriau & Cie, Boulogne-Billancourt, France

[21] Appl. No.: 725,279

[22] Filed: Sep. 21, 1976

[30] Foreign Application Priority Data

Sep. 23, 1975 France .................................. 75 29170
Jul. 16, 1976 France .................................. 76 21891

[51] Int. Cl.² .............................................. G01F 9/00
[52] U.S. Cl. .................................................. 73/119 A
[58] Field of Search ................ 73/119 A, 398 AR, 389

[56] References Cited

U.S. PATENT DOCUMENTS

| | | |
|---|---|---|
| 3,511,088 | 5/1970 | Weaver .............................. 73/119 A |
| 3,937,087 | 2/1976 | Heggie .......................... 73/119 A X |

*Primary Examiner*—Jerry W. Myracle
*Attorney, Agent, or Firm*—Larson, Taylor and Hinds

[57] ABSTRACT

The invention relates to an apparatus for detecting the injection into an internal combustion engine, and in particular a diesel engine, comprising an injection pump, by means of an injector and at least one length of connecting tubing between the pump and the injector, this apparatus comprising means for detecting the transverse deformation of the connecting tubing under the pressure of the injected fuel.

The detection means are disposed between gripper means for firmly locking the connecting tubing at two non-contiguous zones, and are carried by these gripper means in such a way that the sensitive parts of the detection means are applied, in the operative position of the apparatus, at least to the central part of the tubing between these two zones.

16 Claims, 8 Drawing Figures

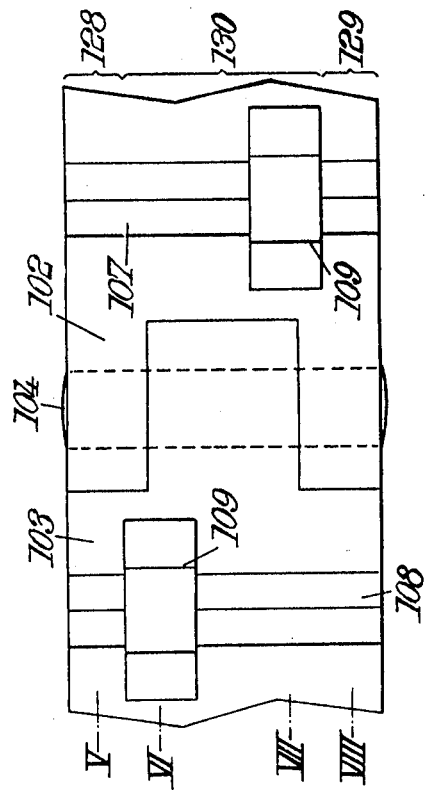
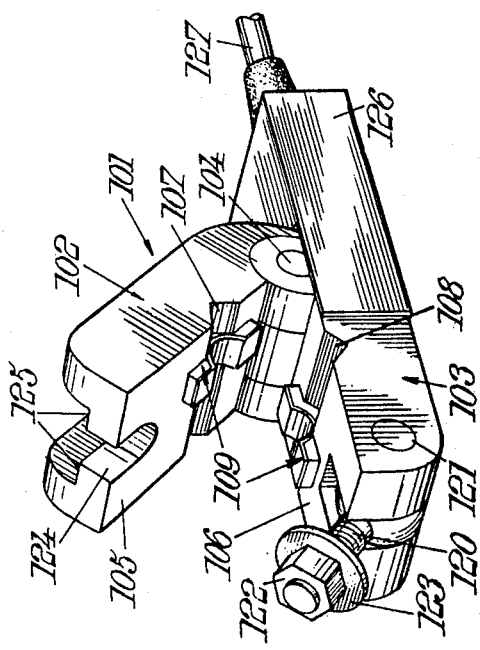
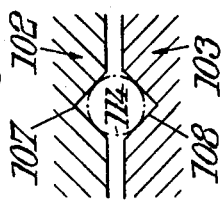
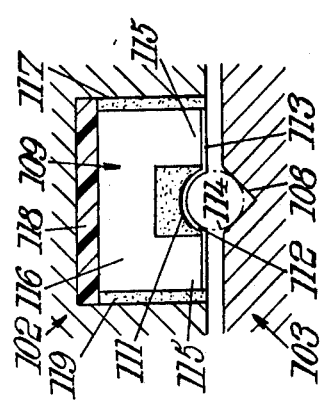
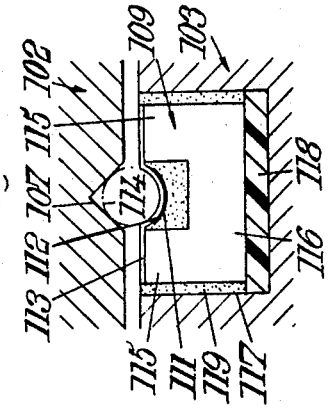
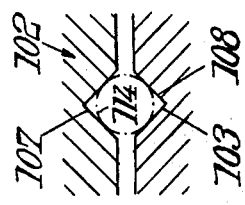

APPARATUS AND METHODS OF DETECTING INJECTION IN A DIESEL ENGINE

The present invention is concerned with improvements in apparatus and methods for the detection of injection in an internal combustion engine, particularly a diesel engine, the engine comprising an injection pump, at least one injector, and at least one length of connecting tubing between the pump and the injector. The apparatus and methods according to the invention are based on the principle of detection of the transverse deformation of the tubing (that is to say essentially the increase in transverse dimension, and in particular of its external diameter in the case of tubing of circular section) under the effect of the pressure of the injected fuel.

Detection means for reading such deformation of the tubing are already known.

These detection means essentially comprise a pair of jaws between which the connecting tubing is clamped, piezoelectric transducers being interposed between each jaw and the tubing. When fuel under pressure is injected into the tubing from the pump in the direction of the corresponding injector, the tubing dilates under the effect of the pressure of the fuel and a variation appears in the output signal delivered by the transducers.

The drawback of these known means resides in the fact that they are sensitive to vibrations communicated in the tubing, notably vibrations brought about by the valves of the pump and of the injector when these valves strike their seats. These vibrations cause the tubing to move slightly relatively to the jaws, having regard to the inertia of the jaws, and this leads the pickups to produce parasitic signals of substantial amplitude and the useful signals are lost in the parasitic signals.

Moreover, these known means require minute setting before any one measurement can take place.

It is an object of this invention to avoid these drawbacks, and to provide an apparatus and method which will give a useful signal which has a much greater amplitude than the noise signal, and which in practice will not require any preliminary adjustment.

A further object is to provide an apparatus which can be brought into use on the connecting tube rapidly and easily.

In accordance with the invention, the means of detection are disposed between gripper means for firmly locking the connecting tubing at two non-contiguous zones, and are carried by these gripper means in such a way that the sensitive parts of the detection means are applied, in the operative position of the apparatus, at least to the central part of the tubing between these two zones.

In accordance with an advantageous feature of the invention the gripping means comprise a solid mounting devised so as firmly to grip the tubing at two spaced zones so as to enframe a central portion of the tubing, and the detection means comprise, on the one hand, at least one support mounted on the mounting and adapted to be applied to the external surface of the central portion of the tubing and to embrace this external surface over a part of its periphery and, on the other hand, at least a sensitive part rigid with said support and positioned so as to be adapted to measure the transverse deformation of the central part of the tubing.

In effect, the inertia of the tubing is increased and the part of the latter at which the measurements are taken is rigidified; by this means the transmission of parasitic vibrations to the detection means are eliminated and the signal/noise ratio is improved at the output of the detection means.

In a preferred embodiment the gripper means comprise a clamp having two solid jaws each comprising a throat disposed in such a way that when the jaws are closed the tubing is engaged between these throats, and the detection means are carried, with the interposition of resilient means, by one and/or the other jaw of the grippers and are mounted in such a way that, when the grippers are brought into its closed position, the aforesaid detection means first of all are applied to the central portion of the tubing and then disappear in view of the aforesaid resilient means.

This arrangement considerably simplified the assembly of the apparatus on the tubing while at the same time a correct clamping of the tubing is ensured as is the application of the sensitive part of these detection means against the wall of the tubing.

Speaking generally, the method in accordance with this invention for detecting the injection, by detection of the transverse deformation of the tubing under the action of the pressure of the fuel injected into the latter comprises measuring this deformation at a part of the tubing which is enframed between two zones at a position at which the tubing is firmly held.

Figure 2:
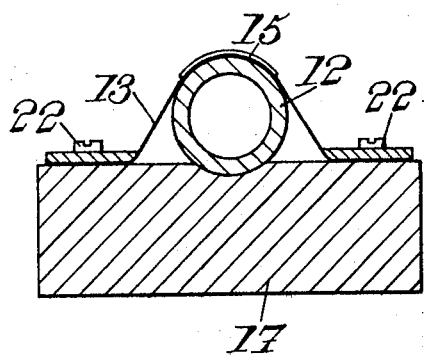

The invention may be better understood with reference to the following description and non-limitative embodiments thereof given with reference to the accompanying drawings, in which:

FIG. 1 is a perspective illustration of a detection apparatus in accordance with the invention, FIG. 2 is a sectional view on the line II—II of FIG. 1, FIG. 3 is a perspective view of another apparatus within the invention, FIG. 4 is a top view of the apparatus of FIG. 3 having its jaws open and arranged one as an extension of the other, and FIGS. 5 to 8 illustrate in partial sections on the lines V—V to VIII—VIII respectively the apparatus of FIG. 4 in operative position.

FIGS. 1 and 2 illustrate an embodiment of a detection apparatus in accordance with the invention which is such as to enable the method of the invention to be practised in most elementary fashion.

The detection apparatus, which has been designated generally by the reference numeral 10 essentially comprises on the one hand gripping means constituted by a solid mounting 11 which locks the jointing tubing 12 as with grippers and, on the other hand, means for detecting the transverse deformation of the tubing consisting of at least one deformation pick-up. This latter comprises an elongated and deformable support 13 or 14 in the form of a clip which is rigidly connected to the solid mounting 11 at its ends and is firmly applied to a part of the external surface of the tubing 12. This support 13 or 14 carries at least one sensitive element, 15 or 16 respectively, adapted to put out an electrical signal of a variable amplitude which depends on the transverse deformation of the tubing.

The mounting 11 is made up of three elements: on the one hand, a base 17 which may take any form but which, for convenience of manufacture, may be in the form of an elongated parallelepipedic block; in addition there are two members 19, 20 which can be rigidly fastened to the ends of the base 17.

To facilitate positioning of the mounting on the tubing and to obtain correct clamping of the latter without it being crushed, the base 17 and the members 19, 20 are provided with longitudinal throats which may be of semi-circular profile; the combination of the throats of elements 17, 19 and 17, 20 then provide the tubular cavities of which the diameter should be such that the tubing will be firmly gripped therein.

It will be understood that the throats could have other suitable shapes.

The members 19, 20 are fixed to the element 17 by any appropriate means for example by screws 21.

To obtain optimum sensitivity use is preferably made of deformation pick-ups, as illustrated in FIG. 1.

In accordance with the invention, the two supports 13, 14 carrying sensitive elements 15 and 16 are arranged in tandem on the portion 12a of the tubing between the two members 19 and 20, and they perfectly conform with a part of the external surface of the tubing, the sensitive elements being fixed to the external surface of the supports at the level of the part of the latter which is in contact with the tubing 12.

The supports 13, 14 are fixed at their free ends to the base 17 by appropriate fastening means (different from the means previously envisaged for assembling the elements 17, 19 and 20) which ensures the application of the support to the tubing.

It is necessary that these fastening means which apply the supports to the tubing shall act with a constant and reproducable force, although the actual degree of this force is not critical per se. It will be enough if this force is sufficient for the supports to be stressed over the tubing so as to be deformed equally and simultaneously at the same time but this force must not of course be sufficient as to exceed the breaking stress limit of the material of the supports.

To this end it is of advantage if resilient means (not shown in the drawings) are interposed between the fastening means, for example the screws 22) and the supports so that the latter will be applied to the tubing with a calibrated pre-stressing effect.

Preferably the supports are made of a metal of the least resilience which can possibly avoid the phenomena of resonance and vibration, whilst as the same time it will follow the deformations of the tubing as faithfully as possible.

Supports of brass will fulfill these conditions.

Although the deformation pick-ups of various types may be used in the apparatus 10, it will be of advantage in simplifying the electronic circuits to use strain gauges cemented to the supports 13 and 14 and connected for example into a bridge electric circuit. This will give great sensitivity.

The embodiment which has just been described is particularly advantageous because the strain gauges 15 and 16 are connected to the tubing 12 through the intermediary of supports 13 and 14, but the latter are rigidly connected to the mounting 11 and not to the tubing 12: thus they are not a party to the assembly and attachment means, they only have an intermediary function and a function of supporting the gauges. This is a necessary condition to avoid the electrical signal given by the strain gauges being swamped in the ambient noise.

Referring to FIGS. 3 to 8 description will now be given of a preferred apparatus within the invention, this apparatus being devised on the same criteria as the apparatus described above, but being so designed as to be readily and repidly mounted on the tubing.

As may be seen in FIG. 3 the detection apparatus is essentially in the form of grippers 101 the two solid jaws 102 and 103 of which are articulated at one end thereof by a common pintle 104.

At their two opposed faces, respectively 105 and 106, the jaws 102 and 103 have threads 107 and 108 respectively, which extend substantially parallel to the pivotal axis 104. It is advantageous for a reason which will be explained later that the throats 107 and 108 have a transverse V-shape, and the faces defining this V preferably being at an angle of 90° to one another.

Each of the jaws 102, 103 of the grippers 101 has a deformation pick-up 109. As will be best seen from FIGS. 6 and 7, each pick-up 109 comprises a sensitive element 111, for example a resistant strain gauge, firmly connected to the central inversely curved part 112 of a plate 113 of a material which is deformable but of small resilience, for example of brass.

The concavity of the central part 112 faces the exterior in such a way that it is able, when the apparatus is placed on a length of tubing 114, to take the external form of the latter over a part of its periphery.

To cater for convenient measurement of the transverse deformation of the tubing, it is only necessary that the central part 112 of the plate 113 is able to deform at the same time as the wall of the tubing 114 and that the remainder of the plate 113 can remain fixed.

For this purpose the free ends of each plate 113 are fixed by any suitable means (not shown) such as screws, rivets etc., to the free ends of the intermediate part 116 which is substantially of U-form; the convex face carrying the sensitive element 111 of the plate 113 is housed between the jaws of the piece 116.

Each jaw 102, 103 is provided with a cavity 117 adapted to accommodate a pick-up 109; a plate 118 of a deformable resilient material, such as "Neoprene" or "Eladip" is interposed between each pick-up 109 and the bottom of the corresponding cavity 117 and this fulfils the function of a spring acting under compression for a reason which will be indicated later.

In addition each pick-up 109 is embedded in the corresponding cavity in a soft resilient material 119, for example of "Silastene" which rigidly secures the pick-up to the corresponding jaw of the grippers whilst at the same time allowing for small amplitude displacements both perpendicularly to the surface of this jaw and transversely. This arrangement has the advantage of mechanically insulating the pick-up from the jaw which carries it, and avoids the transmission of mechanical vibrations to the pick-up such as would interfere with the measurement programme but at the same time give the pick-ups certain freedom to enable them to be automatically positioned against the tubing when applied to the tubing for taking a measurement.

The depth of the cavities and the height of the intermediate pieces 116 are so chosen that, taking into account the thickness of the plates 118, the sensitive parts of the pick-ups 109 project slightly from the surfaces 105, 106 of the jaws 102, 103 carrying them; apart from this the central concave parts of the plates 113 carrying sensitive elements 111 are aligned with the throats 107 and 108.

Locking and unlocking means are provided to enable the grippers 101 to be brought into the closed position and locked. These means may for example be a threaded rod 120 pivoting around an axis 121 rigid with the free end of the jaw 103, this rod 120 carrying a nut 122 and a washer 123; the jaw 102, in turn, is provided at its free end with a recess 124 and a seat-forming part 125 around this recess.

The apparatus may be completed by a housing 126 accommodating the electronic circuits for manipulating the signals emitted by the sensitive elements 111 (the wires connecting the elements 111 to the electronic circuits not being shown in the drawings), a cable 127 connecting the apparatus to all the instruments which are appropriate to amplifying and transforming the electrical signals received and to implement the measuring.

When the gripper 101 is assembled around the tubing 114 the latter is engaged between the cavities 112 of the pick-ups 109, which are projecting (as indicated above), and the parts of the throats 107, 108 opposite these cavities.

As mentioned above the tubing 104 automatically positions itself correctly in the throats 107, 108 because of the V-form of the latter; in addition, because of the freedom of transverse movement conferred by the soft material surrounding them, the pick-ups likewise automatically position themselves correctly against the tubing 104 even where the latter does not initially conform exactly to the concave parts 112.

When the two jaws 102, 103 are locked by turning the nut 122 and the washer 123 against the seat 125 provided on the jaw 102, the pick-ups 109 are forced towards the bottom of cavities 117 and firmly compress plates 118.

In the operative position of the grippers 101, the pick-ups 109 are thus completely embraced in the cavities 117 and the tubing 114 is clamped over the whole width of the grippers partly between the extreme zones 128, 129 (FIG. 4) of the throats 107 and 108 (as illustrated in FIGS. 5 and 8), and partly between the cavities 112 and the portions of throats 107, 108 opposite the cavities in the central zone 130 (FIG. 4) of the throats 107 (as illustrated in FIGS. 6 and 7).

The apparatus just described thus has the considerable merit of only requiring from the operator a single operation of means for closing and locking the jaws 102, 103 for, simultaneously, suitably positioning the tubing in relation to the detection means, firmly clamping the tubing to confine it and finally applying the pick-ups against the tubing under a suitable pressure.

In addition, implementation of this apparatus is simple because it does not call for any complex arrangements; the component elements are small in number, are inexpensive and can readily be fabricated.

Finally the apparatus can be made of a form which is sufficiently compact to cater for simple and rapid mounting on the tubing even when this tubing is sighted in a locality which is difficult of access.

It will be understood that the invention is not limited to the particular methods of embodiment which have been described, but can be implemented in other various ways within the scope of the invention. In particular, the means for closing and locking the jaws of the grippers 101, (121 to 125) have only been illustrated by way of example above and in the drawings and can be replaced by any other known system affording rapid locking, as, for example, a rotary cam system, a ball and socket system, a dead centre system, etc., provided always that, after locking, the pick-ups are applied against the tubing with a force within predetermined limits of value.

We claim:

1. Apparatus for detecting the injection of fuel into an internal combustion engine through a fuel line tubing comprising first and second gripper means for firmly gripping, in operative position, around the periphery of said fuel line tubing at two non-contiguous zones, means for supporting said gripper means in said operative position, means for detecting the transverse deformation of said tubing caused by the pressure of fuel injected therethrough, said detecting means being supported by said supporting means at a position between said two non-contiguous zones.

2. Apparatus according to claim 1 wherein said gripper supporting means comprises a solid member, said first and second gripper means comprising spaced zones of said solid member, and wherein said detecting means comprises at least one support member mounted on said solid member and constructed and arranged to be applied to the external surface of a portion of tubing positioned between said first and second gripper means and to embrace this external surface over a part of its periphery and a sensor rigid with said support member and positioned so as to be adapted to measure transverse deformation of said portion of tubing.

3. Apparatus according to claim 2, further comprising locking means provided between the solid member and the support member so as to apply the support against tubing with a calibrated prestressing.

4. Apparatus according to claim 2 wherein said first and second gripper means comprise a clamp having two solid jaws each comprising a throat disposed in such a way that when the jaws are closed, the tubing is engaged between these throats, and wherein said detecting means are carried, with the interposition of resilient means, by at least one jaw of the grippers and is mounted in such a way that when the first and second gripper means are brought into closed position, said detection means are first applied to the tubing and then recede into said at least one jaw in view of the aforesaid resilient means.

5. Apparatus according to claim 4, wherein said throats have a V-shape in transverse section.

6. Apparatus according to claim 4, wherein the support member of the sensor of each of the detection means is carried by an intermediate rigid piece.

7. Apparatus according to claim 6, wherein each jaw is provided with a cavity in which is accommodated the intermediate part of the corresponding detection means, the resilient means being interposed between the said intermediate part and the bottom of the cavity.

8. Apparatus according to claim 4, wherein the resilient means comprises a plate of resiliently deformable material.

9. Apparatus according to claim 6, wherein a soft material is interposed between each intermediate piece and the lateral walls of the corresponding cavity.

10. Apparatus according to claim 9, wherein said sensors comprise strain gauges.

11. Apparatus according to claim 4, wherein closure means are provided on the jaws of the grippers for bringing the latter into a closed position and holding it closed.

12. Apparatus according to claim 11, further comprising means for regulating the force of said closure means.

13. Apparatus according to claim 2, wherein the detection means are two in number.

14. Apparatus according to claim 13, wherein each jaw carries a detection means, one being offset relatively to the other depending on the direction of the throats.

15. Apparatus according to claim 2, wherein the support member of the sensor of each of the detection means is made of a material of low resilience.

16. In a method of detecting the injection of fuel through tubing into an internal combustion engine in which the fuel injection is detected by detecting the transverse deformation of the tubing due to the pressure of the fuel injected through said tubing, the improvement wherein said deformation is detected at a portion of the tubing located between two spaced zones, the tubing being firmly clamped at said spaced zones by gripping means gripping around the periphery of the tubing and holding said tubing in fixed position independently of the detecting of said deformation.

* * * * *